(12) United States Patent
Hodowanec

(10) Patent No.: US 7,435,054 B2
(45) Date of Patent: Oct. 14, 2008

(54) SYSTEM AND METHOD FOR MECHANICAL MOUNTING OF A DEVICE ONTO A SHAFT

(75) Inventor: Mark Hodowanec, Freehold, NJ (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 278 days.

(21) Appl. No.: 10/901,332

(22) Filed: Jul. 28, 2004

(65) Prior Publication Data

US 2005/0111984 A1    May 26, 2005

Related U.S. Application Data

(60) Provisional application No. 60/490,863, filed on Jul. 28, 2003.

(51) Int. Cl.
H02K 9/06 (2006.01)
F16D 1/06 (2006.01)
F04D 29/26 (2006.01)

(52) U.S. Cl. .................................. 416/215
(58) Field of Classification Search ............. 416/204 R, 416/213 A, 213 R, 215, 244 R; 403/331, 403/381
See application file for complete search history.

(56) References Cited

U.S. PATENT DOCUMENTS

| | | | | |
|---|---|---|---|---|
| 3,832,091 A | * | 8/1974 | Hoffman | 416/184 |
| 4,373,831 A | * | 2/1983 | Crawford | 403/318 |
| 4,943,209 A | * | 7/1990 | Beehler | 416/204 R |
| 4,958,984 A | | 9/1990 | Aoi et al. | 415/55.1 |
| 5,741,124 A | * | 4/1998 | Mazzucato et al. | 417/415 |
| 5,938,405 A | | 8/1999 | Coleman | 416/170 |
| 7,242,559 B2 | | 7/2007 | An | |

FOREIGN PATENT DOCUMENTS

| | | |
|---|---|---|
| DE | G 72 42 559.3 | 9/1974 |
| EP | 391989 | 3/1924 |
| EP | 7242559 | 9/1974 |
| EP | GM 75 23 126 | 3/1976 |
| EP | 01255456 | 10/1989 |

OTHER PUBLICATIONS

Patent Cooperation Treaty—Written Opinion of the International Searching Authority, Jan. 28, 2006.
PCT International Search Report mailed Dec. 6, 2004.

* cited by examiner

*Primary Examiner*—Edward Look
*Assistant Examiner*—Nathaniel Wiehe

(57) ABSTRACT

A mechanical mount axially and radially secures a device, such as a fan, to a shaft of a motor without a need for setscrews or keyways. Elimination of a keyway and setscrew for securing a fan to a motor shaft minimizes stress that the fan is subjected to during its operation. Certain exemplary embodiments of a system of the present invention comprising: a device; a mount of hardened material having a insertion edge with a concave shape secured to the device; and a shaft including an axial groove having a concave shape and a circumferential groove, wherein the mount along the insertion edge is insertable within the axial and circumferential groove, the concave shape of the insertion edge of the mount and the shape of the axial groove promoting a secure fit between the shaft and the mount to substantially prevent movement of the device.

17 Claims, 5 Drawing Sheets

SYSTEM AND METHOD FOR MECHANICAL MOUNTING OF A DEVICE ONTO A SHAFT

CROSS-REFERENCE TO RELATED APPLICATIONS

This application claims priority to, and incorporates by reference herein in its entirety, U.S. Provisional Patent Application Ser. No. 60/490,863, filed 28 Jul. 2003.

BACKGROUND

A device, such as a fan, that is secured onto a shaft of a machine, such as s motor, must be secured in a manner that prevents axial or radial movement of the device. As shown in FIG. 1, certain conventional systems and methods for securing devices, such as a fan, onto a motor shaft, require setscrews and keyways. A keyway is machined directly onto the fan and is also machined into the shaft. The fan is drilled and tapped to receive a setscrew. The fan is mounted onto the shaft and secured radially by a common key. The key is secured by a setscrew that traverses the keyway provided by the fan. This setscrew axially retains the fan. It can be appreciated that disadvantages caused by this conventional system and method for mounting a device to a motor shaft are that keyways and setscrews increase stress concentration, thereby effectively increasing the stress that the fan's structure is subjected to during operation. Excessive stress tends to result in decreased reliability, thereby increasing overall operating costs of the motor.

It can be appreciated that conventional systems have attempted, but have failed to remedy the problem that a device such as a fan, which is secured to a motor, receives excessive and destructive stress during its operation. For example, certain conventional systems and methods apply less interference in the fit-up between a fan and a shaft; however this requires tighter machining tolerances. Other conventional systems include stronger material for mechanically mounting a fan. However, it will be appreciated that these conventional methods and systems are particularly costly and inefficient. Therefore, there is a need for an efficient, effective system and method for mechanically mounting a device, such as a fan, to a motor without subjecting the device to increased stress during its operation.

SUMMARY

The present invention axially and radially secures a device, such as a fan, to a shaft of a motor without a need for setscrews or keyways. Elimination of a keyway and setscrew for securing a fan to a motor shaft minimizes stress that the fan is subjected to during its operation.

It will be appreciated that this system and method allows for more efficient use of materials used to fabricate and machine the fan. It will further be appreciated that the present invention allows for machining the mechanical mount of a fan to a motor shaft with looser tolerances and use of less costly material. One of ordinary skill in the art will recognize that the present invention lowers fan stress, reduces fabrication cost of the fan with the use of less costly material, allows for greater interference (looser machining tolerances), decreases maintenance costs and provides for increased fan life.

BRIEF DESCRIPTION OF THE DRAWINGS

A wide variety of potential embodiments will be more readily understood through the following detailed description of certain exemplary embodiments, with reference to the accompanying drawings in which.

DEFINITIONS

When the following terms are used herein, the accompanying definitions apply:

attaching—the process of fastening, securing, and/or joining.

keyway—a slot for receiving a key.

key—a device that radially constrains two objects such as a fan and a shaft.

machining—the process of cutting, shaping, and/or finishing by machine.

motor—a device that converts electrical energy into mechanical energy to turn a shaft.

mount—that upon which a thing is attached.

mounting—the process of placing in a raised position and/or attaching.

removably—to be able to move from a place or position occupied.

setscrew—a screw for insertion into a keyway for a conventional system and method for mounting a key onto a shaft.

Detail

Figure 1A:
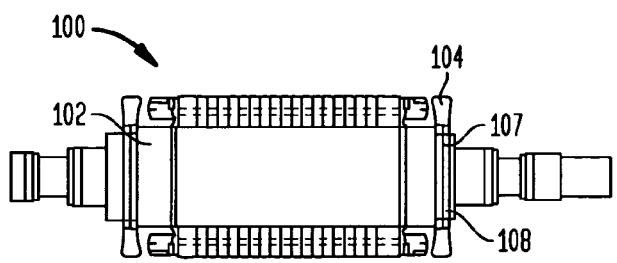
FIG. 1A is a cross sectional view of a conventional keyway/setscrew mounting method.
Figure 1B:
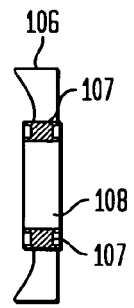
FIG. 1B is a close up view of a conventional keyway/setscrew mounting method.
Figure 2A:
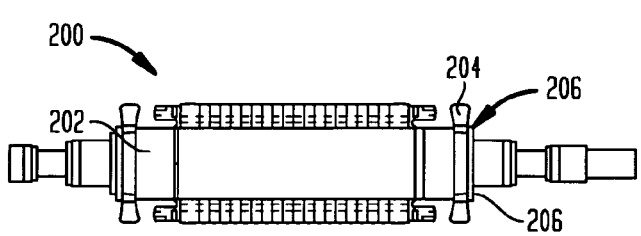
FIG. 2A is a cross sectional view of an exemplary embodiment of a mechanical mounting of a fan of the present invention.
Figure 2B:
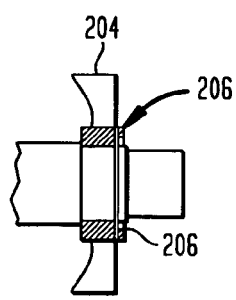
FIG. 2B is a close up view of an exemplary embodiment of a mechanical mounting of a fan of the present invention.

FIG. 2A is a cross sectional view 200 of a mechanical mounting of a fan 204 onto a shaft 202 of the present invention. It will be appreciated that the components shown in FIG. 2A are provided within a motor. FIG. 2B is a close-up view of fan 204. As shown, neither a keyway nor setscrew is used to mount the fan as provided in conventional mounting method of FIG. 1. Instead, in an exemplary embodiment, a mechanical mount 206 is provided at opposing 180 degree positions along the inner disk portion of fan 204.

It will be appreciated that mount 206 is capable of securing the fan to the shaft to constrain radial and axial movement. In an exemplary embodiment, mount 206 is mounted on fan 204 at a location where the stresses are low, and the impact of a stress concentration at these areas does not raise overall stress levels in the fan. One of ordinary skill in the art will recognize that in alternative embodiments of the present invention, stress on a fan may differ, so that a different position may be selected for attaching mount 206 to fan 204.

Figure 3:
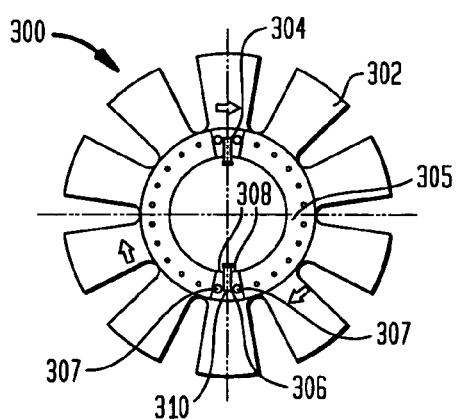
FIG. 3 is a detailed view of an exemplary embodiment of a fan with a mechanical mount of the present invention.

FIG. 3 is a detailed frontal view 300 of an exemplary embodiment of fan 304 that includes a pair of mounts 306. In a present embodiment, a mount 306 is attached to an inner disc portion 305 of fan 302. As provided, the stresses on fan 302 result in securement of each mount 306 in a 180 degrees opposing potion from the other. As shown, mounts 306 are positioned across the y-y vertical line of fan 304.

As shown, in an exemplary embodiment of the invention, mount 306 includes two fabricated steel wedges 308. Each wedge 308 includes an aperture 307 for insertion of a bolt to secure mount 306 to fan 304. It will be appreciated that a securement element, such as a washer is positioned and tightened on the bolt to secure mount 306 to fan 304. A median 310 is positioned between wedges 306 to provide additional support to mount 306. It will be appreciated that in an exemplary embodiment, the elements of mount 306 are composed of steel. However, it will be appreciated that alternative embodiments of the present invention may include a mount 306 composed of other hardened material such as titanium.

Figure 4:
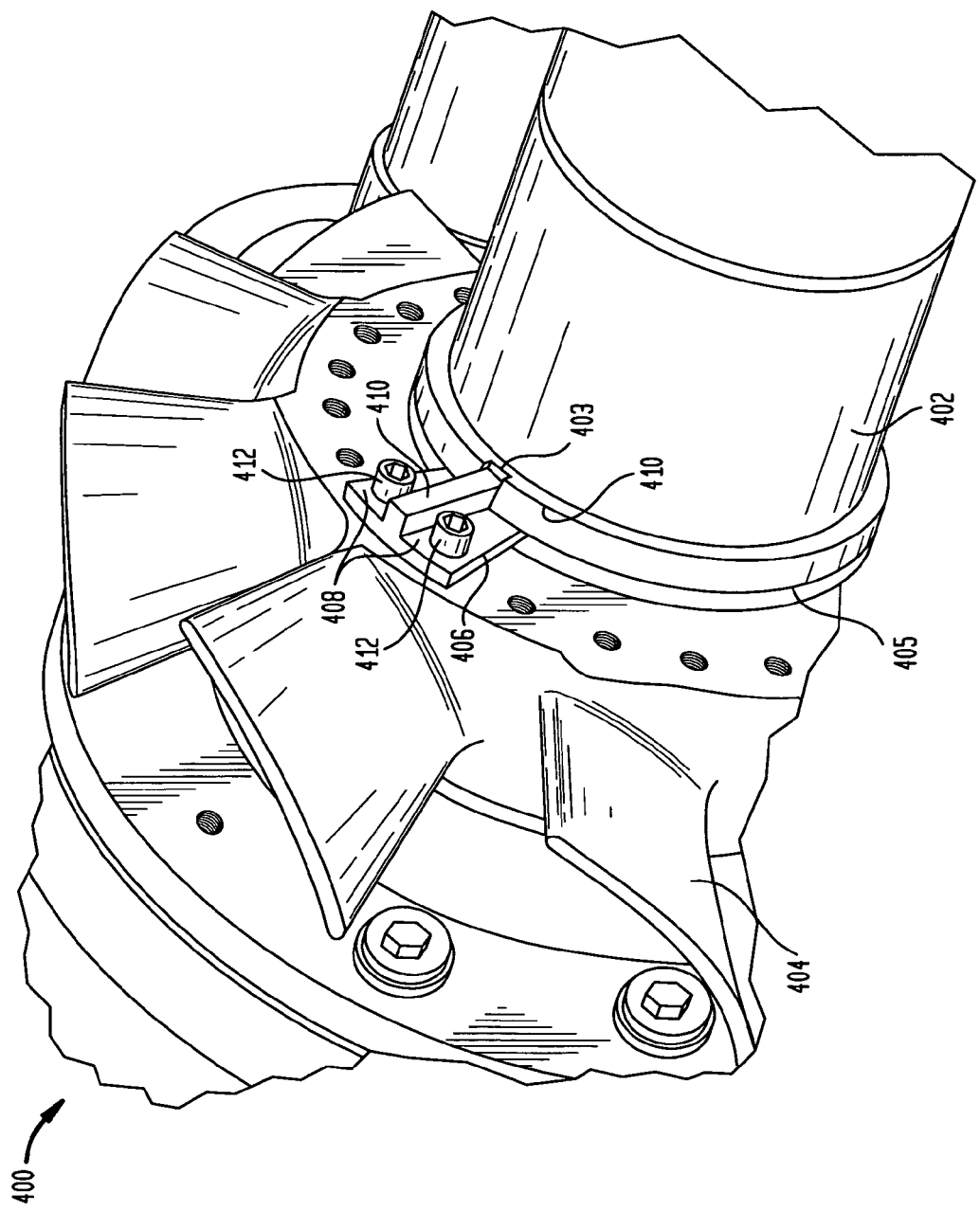
FIGS. 4-5 are detailed external views of an exemplary embodiment of a fan with a mechanical mount of the present invention.

FIG. 4 is an external view 400 of an exemplary embodiment of a mount 406 for securing fan 404 to shaft 402. As shown, mount 406 includes two wedges 408 that are separated by a median 410. A bolt is insertable through an aperture of fan 404 and a corresponding aperture of each wedge 408. It will be appreciated that a securement element, such as a bolt is threaded to tightly secure fan 404 to mount 406. An aperture ring 412 extends from each wedge 408 to protect each bolt and securement element.

A wedge groove 405 and a median groove 403 are machined into shaft 402. It will be appreciated that the proportions of wedge groove 405 and median groove 403 are precisely machined to provide for snug-fit securement of mount 406, to ensure that fan 404 remains attached during operation of a motor. Wedge groove 405 is machined so that it may firmly secure in place each wedge 408. Median groove 403 is machined so that it may firmly secure in place median 410.

Figure 5:
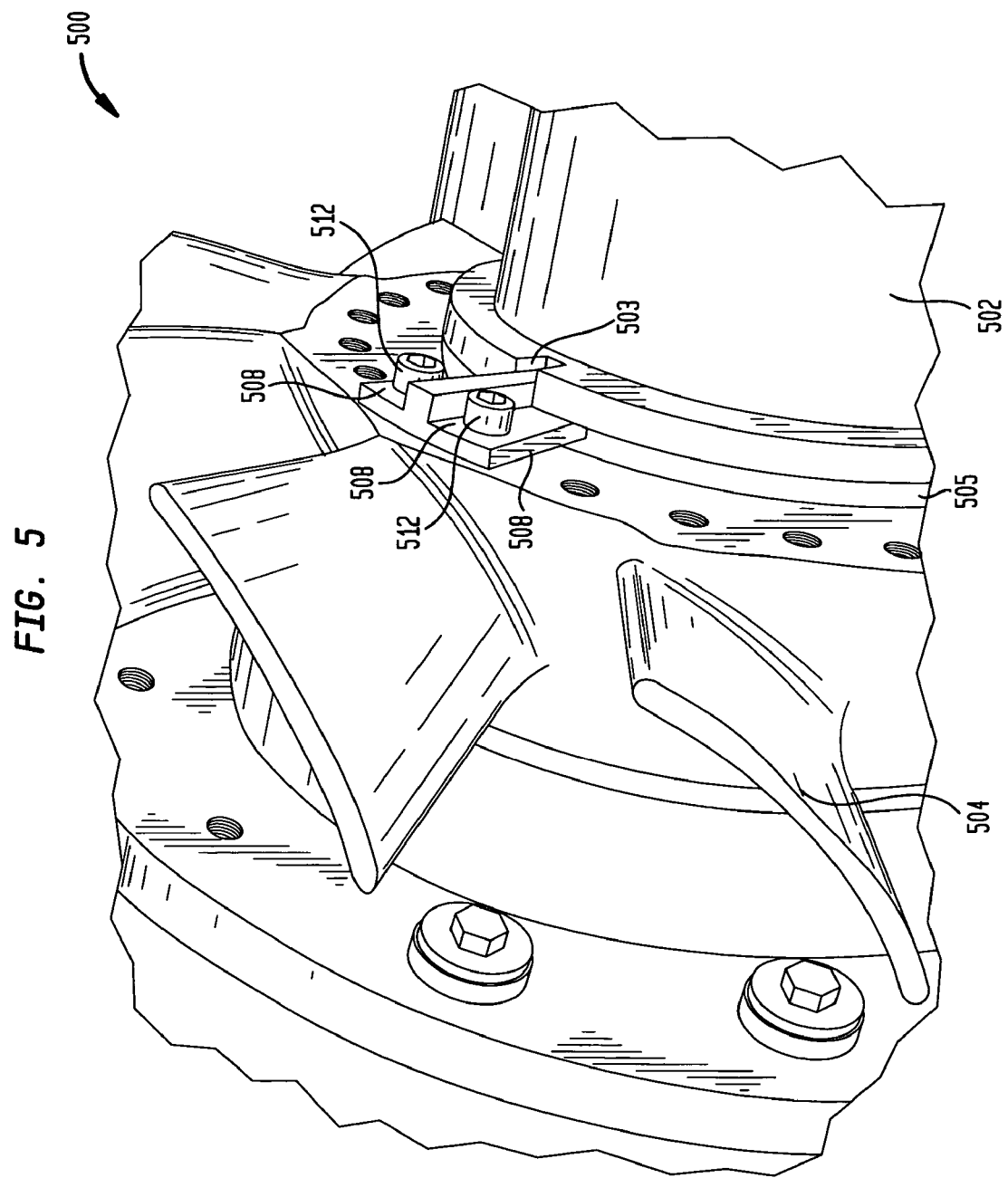

FIG. 5 is an external view 500 of an exemplary embodiment of a mount 506 for securing fan 504 to shaft 502. As shown, mount 506 includes two wedges 508 that are separated by a median 510. A bolt is insertable through an aperture of fan 504 and a corresponding aperture of each wedge 508. It will be appreciated that a securement element, such as a nut is threaded to tightly secure fan 504 to mount 506. An aperture ring 512 extends from each wedge 508 to protect each bolt and securement element.

A wedge groove 505 and a median groove 503 are machined into shaft 502. It will be appreciated that the proportions of wedge groove 505 and median groove 503 are precisely machined to provide for snug-fit securement of mount 506, to ensure that fan 504 remains attached during operation of a motor. Wedge groove 505 is machined so that it may firmly secure in place each wedge 508. Median groove 503 is machined so that it may firmly secure in place median 510.

Figure 6:
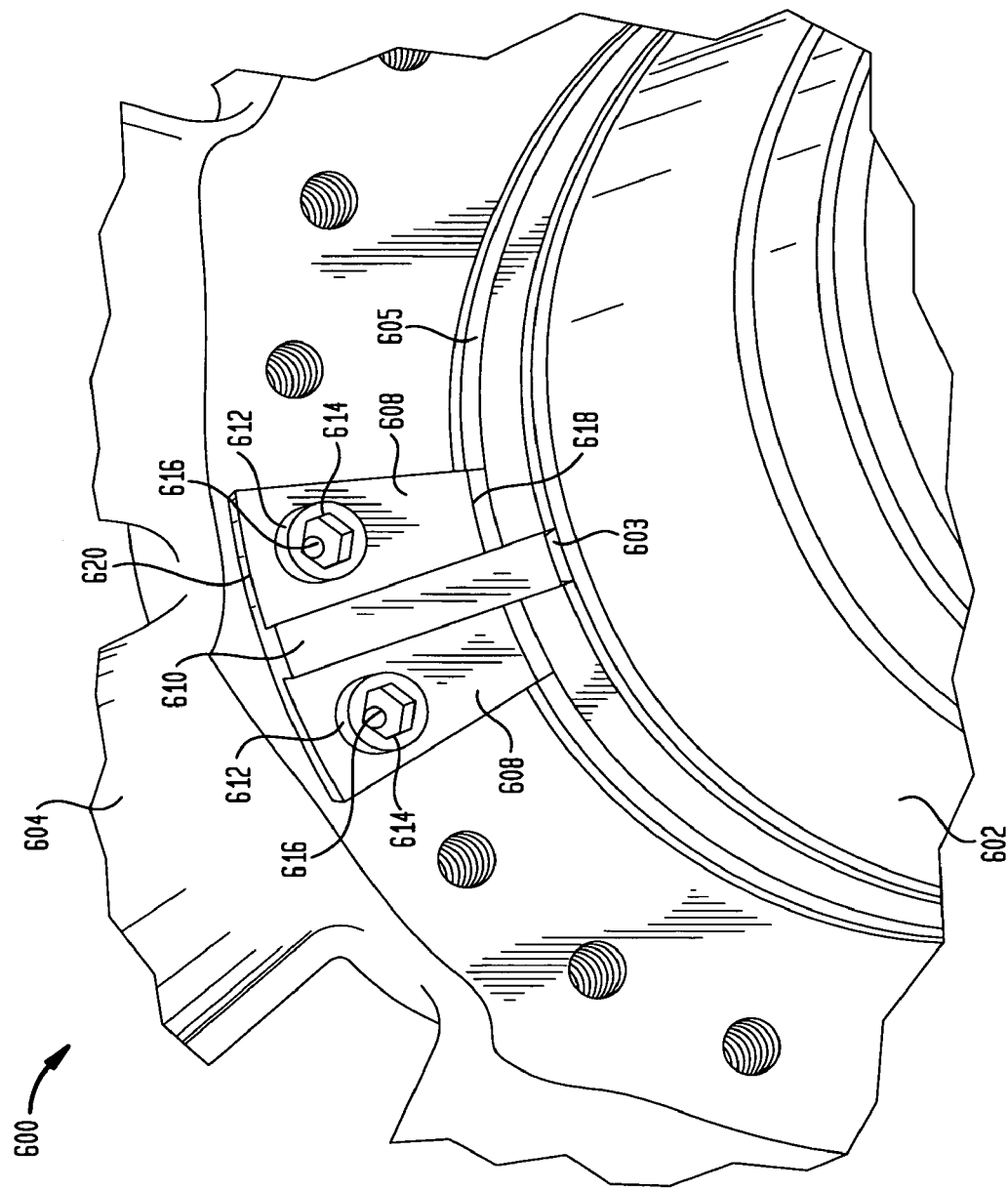
FIG. 6 is a detailed internal view of an exemplary embodiment of a fan with a mechanical mount of the present invention.

FIG. 6 is a detailed internal view 600 of an exemplary embodiment of a fan 604 with a mount 606 of the present invention. As shown, mount 606 includes two wedges 608 that are separated by a median 610. A bolt 616 is insertable through an aperture of fan 604 and a corresponding aperture of each wedge 608. It will be appreciated that a securement element, such as a bolt 614 is threaded to tightly secure fan 504 to mount 506. An aperture ring 612 extends from each wedge 608 to protect each bolt and securement element.

A wedge groove 605 and a median groove 603 are machined into shaft 602. It will be appreciated that the proportions of wedge groove 605 and median groove 603 are precisely machined to provide for snug-fit securement of mount 606, to ensure that fan 604 remains attached during operation of a motor. Wedge groove 605 is machined so that it may firmly secure in place each wedge 608. Median groove 603 is machined so that it may firmly secure in place median 610.

It will be appreciated that the narrow edge 618 is machined to a concave curve that corresponds to the convex curvature of the inner bottom side of groove 605 of shaft 602. The curvature of narrow edge 618 matches the curvature of the inner-bottom side of groove 605 to ensure a snug fit relationship between mount 606 and groove 605 of shaft 602.

Figure 7:
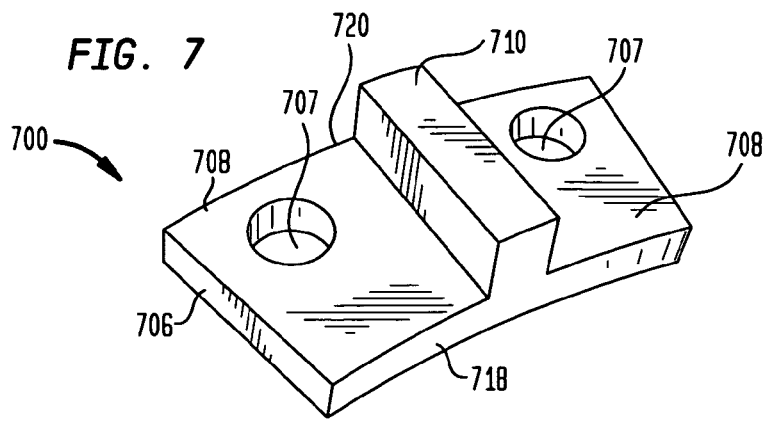
FIG. 7 is a detailed view of an exemplary embodiment of a mechanical mount of the present invention.

FIG. 7 is a detailed close up view 700 of an exemplary embodiment of a mount 706 of the present invention. As shown, mount 706 in an exemplary embodiment of the invention includes two fabricated steel wedges 708. Each wedge 708 includes an aperture 707 for insertion of a bolt to secure mount 706 to a device such as a fan. A median 710 is positioned between wedges 708 to provide additional support to mount 706. It will be appreciated that in an exemplary embodiment, the elements of mount 706 are composed of steel. However, it will be appreciated that alternative embodiments of the present invention may include a mount 706 composed of other hardened material such as titanium.

It will be appreciated that narrow edge 718 is machined to a concave curve that corresponds to the convex curvature of the inner bottom side of groove 605 of shaft 602. The curvature of narrow edge 718 matches the curvature of the inner bottom side of groove 605 to ensure a snug fit relationship between mount 706 and groove 605 of shaft 602.

Figure 8:
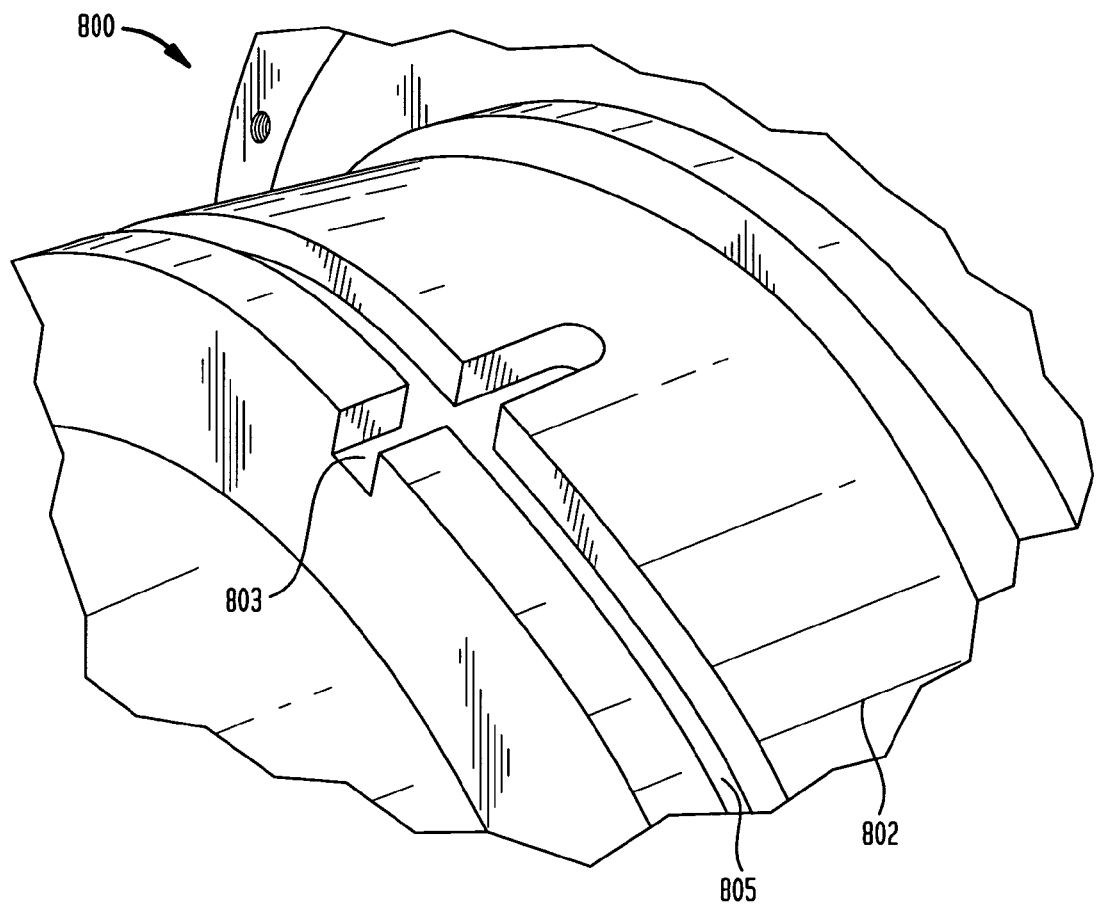
FIG. 8 is a detailed view of an exemplary embodiment of grooves provided to receive a mechanical mount of the present invention.

FIG. 8 is a detailed view 800 of an exemplary embodiment of a groove provided to receive a mount of the present invention. As shown, a wedge groove 805 and a median groove 803 are machined into shaft 802. It will be appreciated that the proportions of wedge groove 805 and median groove 803 are precisely machined to provide for snug-fit securement of mount 806, to ensure that a secured device, such as a fan, remains attached during operation of a motor. Wedge groove 805 is machined so that it may firmly secure in place each wedge of the mount. Median groove 803 is machined so that it may firmly secure in place median 810.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub-ranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render any claim seeking priority hereto invalid, then any such conflicting information in such incorporated by reference material is specifically not incorporated by reference herein.

I claim:

1. A system for securing a device to a shaft comprising:
   a device;
   a mount securable to the device; and
   a shaft including an axial groove and a circumferential groove, a first portion of the mount insertable within the axial groove and a second portion of the mount insertable within the circumferential groove, said mount adapted to secure and substantially prevent movement of the device relative to the shaft, the mount comprising a median positioned between a first wedge and a second wedge, wherein the first wedge, the second wedge, and the median comprise a single component.

2. The system of claim 1, wherein the device is a fan.

3. The system of claim 1, wherein the shaft is comprised by a motor.

4. The system of claim 1, further comprising:
   a plurality of apertures provided in the device, wherein each device aperture corresponds to an aperture provided within one of the first wedge and the second wedge of the mount;
   a bolt threaded through each of the corresponding apertures of the device and the aperture of each wedge of the mount; and
   a securing element for tightening the bolt to secure the device to the mount.

5. The system of claim 4, wherein the securing element is a nut.

6. The system of claim 1, further comprising:
   an external surface of the shaft having a convex shape of a specified degree of curvature; and
   a contact edge of the mount having a concave shape corresponding to the convex shape of a specified degree of curvature of the circumferential groove of the shaft, wherein the corresponding concave shape of a specified degree of curvature enables a secure fit between the mount and the circumferential groove of the shaft to prevent axial movement.

7. The system of claim 1, wherein the mount secures the device to the shaft.

8. The system of claim 1, wherein the mount is constructed of steel.

9. A method for securing a device to a shaft comprising:
   providing the device;
   positioning a mount adjacent to the device;
   securing the mount to the device; and
   inserting a first portion of the mount within an axial groove and a second portion of the mount within a circumferential groove of the shaft, the mount adapted to secure the device to substantially prevent axial and radial movement of the device relative to the shaft, the mount comprising a median positioned between a first wedge and a second wedge, wherein the first wedge, the second wedge, and the median comprise a single component.

10. The method of system of claim 9, wherein the device is a fan.

11. The method of claim 9, wherein the shaft is comprised by a motor.

12. The method of claim 9, further comprising:
    positioning a plurality of apertures provided in the device to each of a corresponding aperture provided within one of the first wedge and the second wedge of the mount;
    threading a bolt through each of the corresponding apertures of the device and the aperture of each wedge of the mount; and
    axially turning a securing element around the bolt to secure the device to the mount.

13. The method of claim 12, wherein the securing element is a nut.

14. The method of claim 9, further comprising:
    providing an external surface of the shaft having a convex shape of a specified degree of curvature;
    providing a contact edge of the mount having a concave shape corresponding to the convex shape of a specified degree of the curvature of the circumferential groove of the shaft; and
    inserting the corresponding concave shape of a specified degree of curvature between the mount and the circumferential groove of the shaft to secure the mount to the shaft to substantially prevent movement of the device relative to the shaft.

15. The method of claim 9, further comprising:
    securing the mount to the device.

16. The method of claim 9, wherein the mount is constructed of steel.

17. A system for securing a device to a shaft comprising:
    a device;
    a mount having a insertion edge with a concave shape secured to the device; and
    a shaft including an circumferential groove having a convex shape and an axial groove, a first portion of the insertion edge of the mount insertable within the axial groove, the second portion of the insertion edge of the mount insertable within the circumferential groove, the mount adapted to substantially prevent axial and radial movement of the device relative to the shaft, the mount comprising a median positioned between a first wedge and a second wedge, wherein the first wedge, the second wedge, and the median comprise a single component.

* * * * *